US012573167B2

(12) United States Patent
Kim et al.

(10) Patent No.: US 12,573,167 B2
(45) Date of Patent: Mar. 10, 2026

(54) METHOD FOR GENERATING AND RECOGNIZING DEFORMABLE OF FIDUCIAL MARKERS BASED ON ARTIFICIAL INTELLIGENCE IN END-TO-END MANNER AND SYSTEM THEREOF

(71) Applicant: Korea Advanced Institute of Science and Technology, Dajeon (KR)

(72) Inventors: Min Hyuk Kim, Daejeon (KR); Mustafa Berk Yaldiz, Daejeon (KR); Andreas Meuleman, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 608 days.

(21) Appl. No.: 17/857,444

(22) Filed: Jul. 5, 2022

(65) Prior Publication Data

US 2023/0016057 A1 Jan. 19, 2023

(30) Foreign Application Priority Data

Jul. 6, 2021 (KR) ........................ 10-2021-0088349

(51) Int. Cl.
*G06V 10/22* (2022.01)
*G06T 15/50* (2011.01)
(Continued)

(52) U.S. Cl.
CPC .......... *G06V 10/225* (2022.01); *G06T 15/506* (2013.01); *G06T 15/80* (2013.01); *G06V 10/774* (2022.01)

(58) Field of Classification Search
CPC .... G06V 10/225; G06V 10/774; G06V 10/82; G06T 15/506; G06T 15/80; G06T 15/205;
(Continued)

(56) References Cited

U.S. PATENT DOCUMENTS

2018/0012411 A1* 1/2018 Richey .................. G06T 19/006
2018/0032641 A1* 2/2018 Dean .................. G05B 19/4099
(Continued)

FOREIGN PATENT DOCUMENTS

KR       20190038318 A       4/2019
KR       20190133044 A       11/2019

OTHER PUBLICATIONS

Peace, E2ETag: An End-to-End Trainable Method for Generating and Detecting Fiducial Markers, 2020, University of Nebraska-Lincoln (Year: 2020).*
(Continued)

*Primary Examiner* — Ming Shui
(74) *Attorney, Agent, or Firm* — Christensen O'Connor Johnson Kindness PLLC

(57) ABSTRACT

The inventive concept relate to a technology, which recognizes widely deformable markers with high accuracy in an end-to-end manner of message encoding and decoding, and which generates and recognizes deformable fiducial markers based on artificial intelligence, and includes generating, by a marker generator, a unique marker pattern as a fiducial marker in an input binary message, rendering, by an imaging simulator, an image by generating a training dataset of a realistic scene image with the generated fiducial marker, and training a marker detector with the rendered image.

17 Claims, 21 Drawing Sheets

(51) Int. Cl.
*G06T 15/80* (2011.01)
*G06V 10/774* (2022.01)

(58) Field of Classification Search
CPC ... G06T 7/11; G06T 7/74; G06T 2207/20081;
G06T 2207/20084; G06T 2207/30204;
G06T 5/80; G06N 3/08
See application file for complete search history.

(56) References Cited

U.S. PATENT DOCUMENTS

2020/0197107 A1*  6/2020  Ryan .................... A61B 90/361
2020/0342652 A1  10/2020  Rowell
2021/0182639 A1*  6/2021  Brent ..................... G06F 3/147

OTHER PUBLICATIONS

Liu, Human-Readable Fiducial Marker Classification using Convolutional Neural Networks, 2017, IEEE Xplore (Year: 2017).*

Wang, AprilTag 2: Efficient and robust fiducial detection, 2016, IEEE Xplore (Year: 2016).*

DeepFormableTag: End-to-end Generation and Recognition of Deformable Fiducial Markers Mustafa B. Yaldiz, Andreas Meuleman, Hyeonjoong Jang, Hyunho Ha, and Min H. Kim, Kaist, ACM Trans. Graph., vol. 40, No. 4, Article 67. Publication date: Aug. 2021 (Year: 2021).*

Timothy Bretl, ChromaTag a colored marker and fast detection algorithm, 10pp., Aug. 9, 2017.

ArUco: a minimal library for Augmented Reality applications based on OpenCV, 2pp., Jan. 21, 2012.

OpenCV. 2020. Open Source Computer Vision Library, 6pp., Dec. 23, 2019.

John Wang and Edwin Olson, AprilTag 2 Efficient and robust fiducial detection, 6pp., Oct. 9, 2016.

* cited by examiner

1

METHOD FOR GENERATING AND RECOGNIZING DEFORMABLE OF FIDUCIAL MARKERS BASED ON ARTIFICIAL INTELLIGENCE IN END-TO-END MANNER AND SYSTEM THEREOF

CROSS-REFERENCE TO RELATED APPLICATIONS

A claim for priority under 35 U.S.C. § 119 is made to Korean Patent Application No. 10-2021-0088349 filed on Jul. 6, 2021, in the Korean Intellectual Property Office, the entire contents of which are hereby incorporated by reference.

BACKGROUND

Embodiments of the inventive concept described herein relate to a technology for generating and recognizing deformable fiducial markers based on artificial intelligence, and more particularly, relate to a method for recognizing widely deformable markers with high accuracy in an end-to-end manner of message encoding and decoding, and a system thereof.

Fiducial markers with binary patterns such as QR code, ARTag, ARToolKit, AprilTag, ArUco, and ChArUco have been used broadly to encode identification codes, embedding messages in various computer graphics, vision, and robotics applications.

Despite the usefulness of these fiducial systems, conventional fiducial markers still show several limitations. First, all the conventional markers assume to be printed on ideally planar and rigid surfaces, and thus conventional marker systems are incapable of detecting severely deformed marker images. Second, marker recognition often fails due to various imaging artifacts of optical/perspective distortion and motion blur when markers are captured in real-world environments. Lastly, the size of a message that may be embedded in markers is limited by the spatial resolution of a binary or color pattern.

Even though various hand-crafted visual features have been proposed alternatively in the previous studies [DeGol et al. 2017; Munoz-Salinas 2012; Olson 2011; OpenCV 2020; Wang and Olson 2016], deformation of fiducial markers has been rarely discussed due to the hardness of challenges. Additionally, several assumptions have been made in imaging conditions as well. For example, there is no optical distortion and motion blur. Unfortunately, when capturing physically printed markers with a camera in the real-world, these assumptions do not always hold, often resulting in unreliable localization, detection, and decoding of marker messages.

Recently, learning-based approaches have been proposed to improve the performance of fiducial marker systems through a set of learnable features or providing a learning-based enhancement of a conventional marker detection method. However, the former method also trains the network in an ideal setup where fiducial markers are located at the center region of training images or perfectly sit on ideal planar surfaces, missing the important localization capability. The latter method detects and refines fiducial corners and the camera pose, relying on a conventional marker system, ChArUco [OpenCV 2020] that assumes ideal imaging scenarios.

Accordingly, there is no robust and practical solution to tackle the deformed marker detection problem without sacrificing messaging capability and detection performance.

(Non-Patent Document 1) Joseph DeGol, Timothy Bretl, and Derek Hoiem. 2017. ChromaTag: a colored marker and fast detection algorithm. In Proceedings of the IEEE/CVF International Conference on Computer Vision (ICCV). 1472-1481.

(Non-Patent Document 2) Rafael Munoz-Salinas. 2012. Aruco: a minimal library for augmented reality applications based on opencv. Universidad de Cordoba (2012).

(Non-Patent Document 3) OpenCV. 2020. Open Source Computer Vision Library. https://opencv.org/. Version 4.2.0.

(Non-Patent Document 4) John Wang and Edwin Olson. 2016. AprilTag 2: Efficient and robust fiducial detection. In IEEE/RSJ International Conference on Intelligent Robots and Systems (IROS). IEEE, 4193-4198.

SUMMARY

Embodiments of the inventive concept provide a method for recognizing widely deformable markers with high accuracy by being jointly optimized through a distinguishable photorealistic renderer in an end-to-end manner by using a deformable marker generator and imaging simulator and a detector network of marker detectors, and a system thereof.

According to an exemplary embodiment, a method for generating and recognizing a deformable fiducial marker based on artificial intelligence includes generating, by a marker generator, a fiducial marker in a generated unique marker pattern in an input binary message, rendering, by an imaging simulator, an image by generating a training dataset of a realistic scene image with the generated fiducial marker, and training a marker detector with the rendered image.

The generating may include generating the marker pattern, which is a series of free-form patterns to encode information in a unique visual code.

The marker detector may include a localizer and a marker decoder. The training may include extracting a region of interest from the rendered image and performing training by simultaneously recognizing at least one or more marker patterns via a deformation-aware transformation.

The imaging simulator may include a differentiable renderer and an imaging artifact augmenter. The rendering may include simulating, by the differentiable renderer, a photorealistic appearance of the fiducial marker and simulating, by the imaging artifact augmenter, imaging artifacts of deformation, perspective/lens distortion, motion blur, compression artifacts, and a variety of illumination conditions.

The generating may include a fully-connected (FC) layer step of applying an FC linear transformation to the input binary message, a generation block step of controlling an appearance of a marker through a convolutional generation block, upsampling a generation block, and performing convolution and normalization operations, and a normalization step of normalizing an output value within [0, 1] range in three color channels for rendering, by applying a processed output to a sigmoid function.

The FC layer step may include applying the FC linear transformation to the input binary message, normalizing a transformed function, and applying an activation function.

The FC layer step may include resizing a function, which is normalized and reconstructed by applying the FC linear transformation, to a four-by-four shape.

The generation block step may include applying a weight of an adaptive instance normalization operator (Adak) to a message function to which the FC linear transformation is applied.

The rendered image may include realistic shading including specular reflection, optical distortion, defocus and motion blur, color alteration, imaging noise, and shape deformation of a marker.

According to an exemplary embodiment, a method for generating and recognizing a deformable fiducial marker based on artificial intelligence includes generating, by a marker generator, a fiducial marker in a generated unique marker pattern in an input binary message, and rendering, by a detector network, an image by generating a training dataset of a realistic scene image with the generated fiducial marker, and performing training with the rendered image.

The generating may include a fully-connected (FC) layer step of applying an FC linear transformation to the input binary message, a generation block step of controlling an appearance of a marker through a convolutional generation block, upsampling a generation block, and performing convolution and normalization operations, and a normalization step of normalizing an output value within [0, 1] range in three color channels for rendering, by applying a processed output to a sigmoid function.

The rendering and the performing of the training may include rendering the image by simulating, by a differentiable renderer in the detector network, a photorealistic appearance of the fiducial marker and simulating, by an imaging artifact augmenter in the detector network, imaging artifacts of deformation, perspective/lens distortion, motion blur, compression artifacts, and a variety of illumination conditions, and extracting, by a localizer and a marker decoder in the detector network, a region of interest from the rendered image and performing training by simultaneously recognizing at least one or more marker patterns via a deformation-aware transformation.

According to an exemplary embodiment, an artificial intelligence-based deformable fiducial marker generation and recognition system includes a marker generator that generates a fiducial marker in a generated unique marker pattern in an input binary message, an imaging simulator that renders an image by generating a training dataset of a realistic scene image with the generated fiducial marker, and a marker detector that performs training with the rendered image.

The marker generator may generate the marker pattern, which is a series of free-form patterns to encode information in a unique visual code.

The marker generator may apply an FC linear transformation to the input binary message, may control an appearance of a marker through a convolutional generation block, may upsample a generation block, may perform convolution and normalization operations, and may normalize an output value within [0, 1] range in three color channels for rendering, by applying a processed output to a sigmoid function.

The imaging simulator may include a differentiable renderer and an imaging artifact augmenter. The differentiable renderer may simulate a photorealistic appearance of the fiducial marker. The imaging artifact augmenter may simulate imaging artifacts of deformation, perspective/lens distortion, motion blur, compression artifacts, and a variety of illumination conditions.

The marker detector may include a localizer and a marker decoder, and may extract a region of interest from the rendered image and may perform training by simultaneously recognizing at least one or more marker patterns via a deformation-aware transformation.

According to an exemplary embodiment, an artificial intelligence-based deformable fiducial marker generation and recognition system includes a marker generator that generates a fiducial marker in a generated unique marker pattern in an input binary message, and a detector network that renders an image by generating a training dataset of a realistic scene image with the generated fiducial marker, and performs training with the rendered image.

The detector network may render the image by simulating a photorealistic appearance of the fiducial marker by using a differentiable renderer and simulating imaging artifacts of deformation, perspective/lens distortion, motion blur, compression artifacts, and a variety of illumination conditions by an imaging artifact augmenter.

The detector network may extract a region of interest from the rendered image and may perform training by simultaneously recognizing at least one or more marker patterns via a deformation-aware transformation, by using a localizer and a marker decoder.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
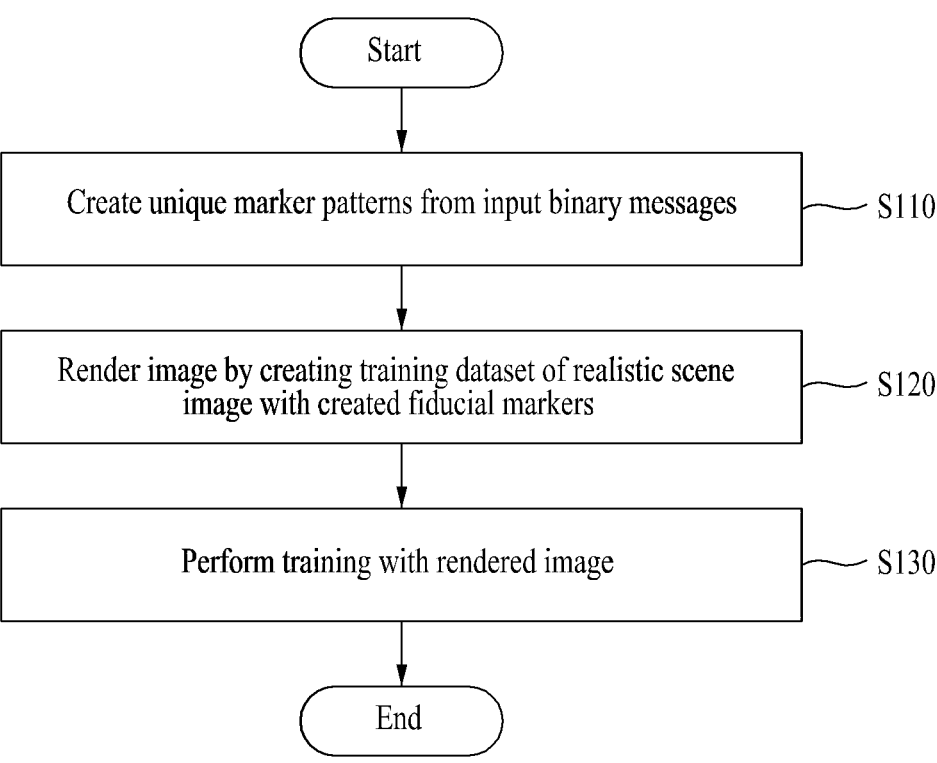
FIG. 1 is a flowchart illustrating operations of a method for generating and recognizing a deformable fiducial marker based on artificial intelligence, according to an embodiment of the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples such that the inventive concept will be thorough and complete, and will fully convey the concept of the inventive concept to those skilled in the art. The inventive concept may be defined by scope of the claims. Meanwhile, the terminology used herein to describe embodiments of the invention is not intended to limit the scope of the invention.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other components, steps, operations, and/or elements in addition to the aforementioned components, steps, operations, and/or elements.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, the best embodiments of the inventive concept will be described in detail with reference to accompanying drawings. The same reference numerals are used for the same components in the drawings and redundant explanations for the same components are omitted.

Embodiments of the inventive concept may recognize widely deformable markers with high accuracy by being jointly optimized through a distinguishable photorealistic renderer in an end-to-end manner by using a deformable marker generator and imaging simulator and a detector network of marker detectors.

Fiducial markers have been broadly used to identify objects or embed messages that are capable of being detected by a camera. Primarily, conventional detection methods assume that markers are printed on ideally planar surfaces. The size of a message or identification code is limited by the spatial resolution of binary patterns in a marker. Markers often fail to be recognized due to various imaging artifacts of optical/perspective distortion and motion blur.

To overcome these limitations, according to an embodiment of the inventive concept, it is possible to propose a novel deformable fiducial marker system specially designed for generating and detecting deformable markers in an end-to-end manner. According to an embodiment of the inventive concept, a learning-based method consists of three main parts. First, a fiducial marker generation network creates learnable fiducial marker patterns to enhance the large-scale message-embedding capability, which may be attached to real-world free-form surfaces. Second, a novel differentiable rendering framework creates a realistic training dataset during optimization, where a set of fiducial markers are simulated with surface deformation and realistic imaging conditions, including specular reflection, perspective/lens distortion, defocus and motion blur, color alteration, and imaging noise simulated in a differentiable manner. Lastly, a marker detection network consists of a localizer network and a novel marker decoder network that samples markers' features with respect to deformation. Then, the marker detection network finally decodes embedded messages within a frame. According to an embodiment of the inventive concept, a marker generator and a marker detector are jointly trained by means of the automatically generated photorealistic training dataset such that the marker generator and the marker detector may detect multiple markers' codes successfully even on severely deformed surfaces under various environments. According to an embodiment of the inventive concept, a differentiable rendering framework that creates immersive markers for real scenes achieves high-quality realism to minimize potential domain gap in the training dataset, outperforming conventional learning-based approaches that merely superimpose markers on photographs.

According to an embodiment of the inventive concept, an end-to-end marker system may create a very large number of messages as unique fiducial markers, for example, theoretically feasible up to 68.7 billion ($=2^{36}$) of 36-bit binary messages with a resolution of 32×32 pixels, which may be recognized very robustly and successfully with high bit accuracy at maximally 29 fps.

Hereinafter, an embodiment of the inventive concept will be described with reference to FIGS. 1 to 8.

Figure 2:
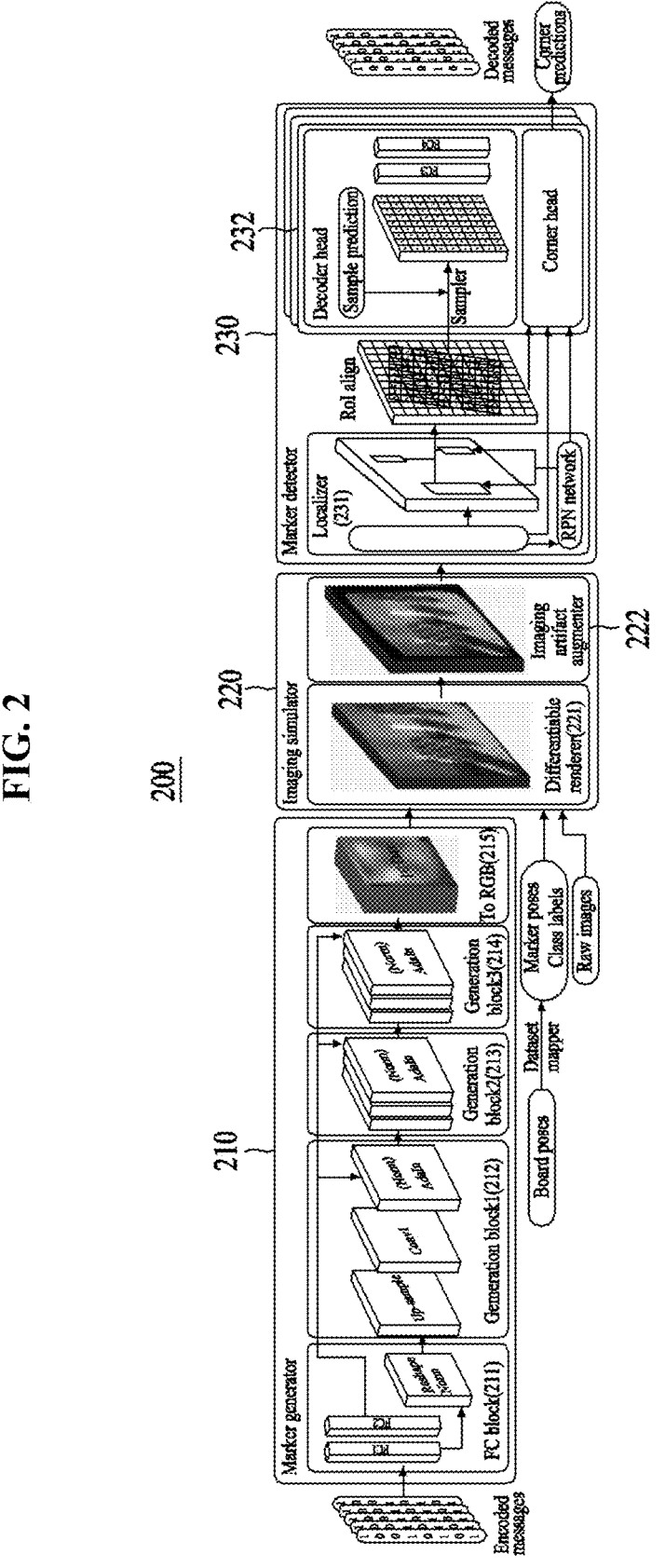
FIG. 2 shows a schematic diagram of an artificial intelligence-based deformable fiducial marker generation and recognition system, according to an embodiment of the inventive concept.

FIG. 1 is a flowchart illustrating operations of a method for generating and recognizing a deformable fiducial marker based on artificial intelligence, according to an embodiment of the inventive concept. FIG. 2 shows a schematic diagram of an artificial intelligence-based deformable fiducial marker generation and recognition system, according to an embodiment of the inventive concept.

According to an embodiment of the inventive concept, each of steps S110, S120, and S130 of FIG. 1 is performed by a marker generator 210, an imaging simulator 220, and a marker detector 230 in the artificial intelligence-based deformable fiducial marker generation and recognition system 200 shown in FIG. 2.

Referring to FIGS. 1 and 2, in step S110, the marker generator 210 creates a fiducial marker in generated unique marker patterns from input binary messages. The marker generator 210 may generate a marker pattern, which is a series of free-form color patterns (black/white and color) to encode information in a unique visual code.

In step S110, the marker generator 210 may include a fully-connected (FC) layer step 211 that applies an FC linear transformation to the input binary messages, generation block steps 212, 213, and 214, which control the appearance of the markers through convolutional generation blocks and each of which applies upsampling at first followed by convolution and normalization operations, and a normalization step 215 that normalizes output values within [0, 1] range in three color channels for rendering, by applying the processed outputs to sigmoid function.

The FC layer step 211 may apply the FC linear transformation to the input binary message, may normalize the transformed function, and may apply an activation function. In addition, the FC layer step 211 may resize a function, which is normalized and reconstructed by applying the FC linear transformation, to a four-by-four shape.

The generation block steps 212, 213, and 214 may apply a weight of an adaptive instance normalization operator (AdaIn) to a message function to which the FC linear transformation is applied.

In step S120, the imaging simulator 220 renders an image by creating a training dataset of a realistic scene image with the created fiducial markers.

The imaging simulator 220 may include a differentiable renderer 221 and an imaging artifact augmenter 222. The imaging simulator 220 may simulate the photorealistic appearance of the fiducial markers by using the differentiable renderer 221 and may simulate various imaging artifacts of deformation, perspective/lens distortion, motion blur, compression artifacts, and a variety of illumination conditions by using the imaging artifact augmenter 222.

In this case, the rendered image may include realistic shading including specular reflection, optical distortion, defocus and motion blur, color alteration, and imaging noise, and shape deformation of markers.

In step S130, the marker detector 230 performs training with the rendered image.

The marker detector 230 may consist of a localizer 231 and a marker decoder 232, and may obtain regions of interest from the rendered image and may be trained by simultaneously recognizing at least one or more marker patterns via deformation-aware transformation.

Hereinafter, an artificial intelligence-based deformable fiducial marker generation and recognition system illustrated in FIG. 2 will be described with reference to FIGS. 3 to 8.

Figure 3A:
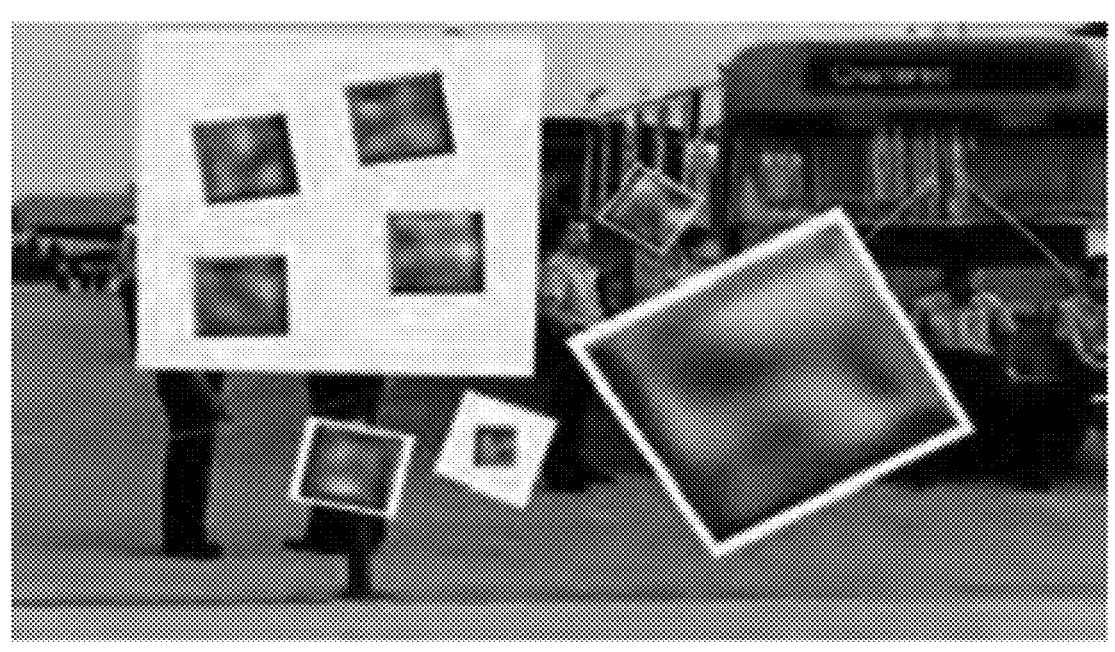
FIGS. 3A and 3B illustrate views for describing an example of rendering, according to an embodiment of the inventive concept.
Figure 3B:
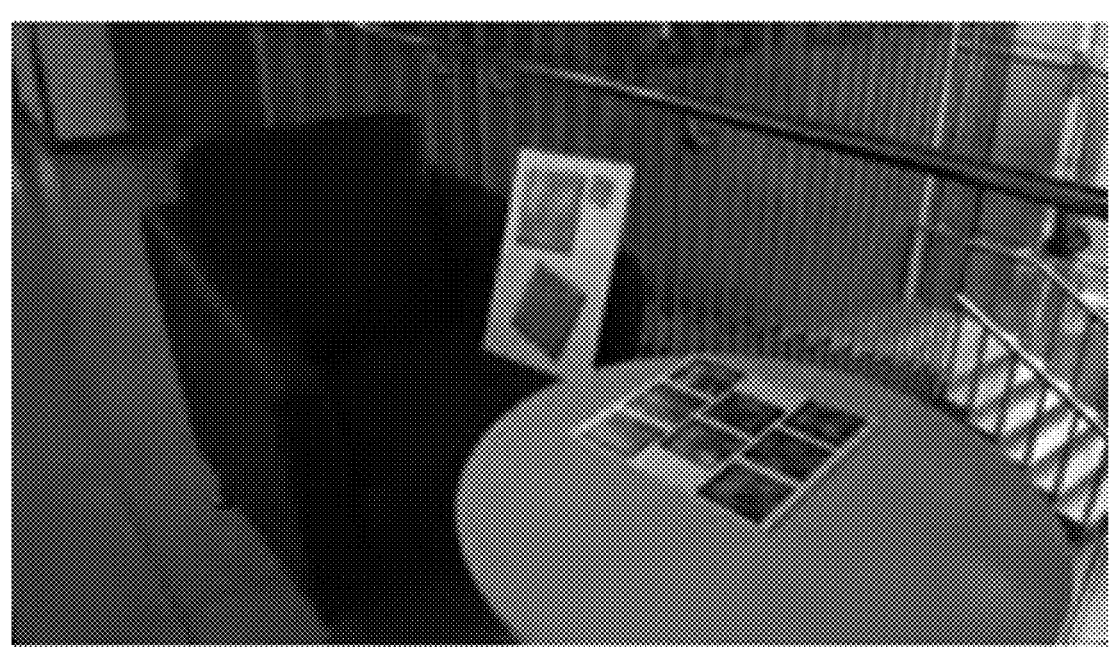
Figure 4A:
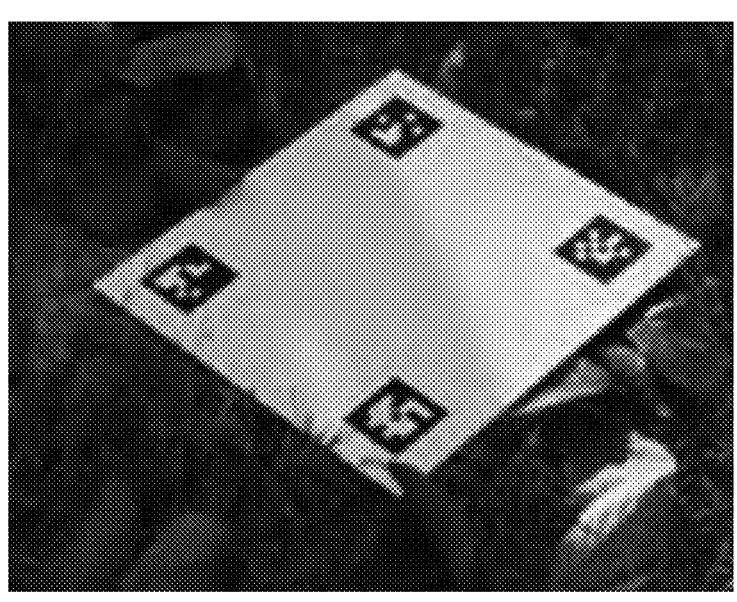
FIGS. 4A to 4F illustrate rendering components, according to an embodiment of the inventive concept.
Figure 4B:
Figure 4C:
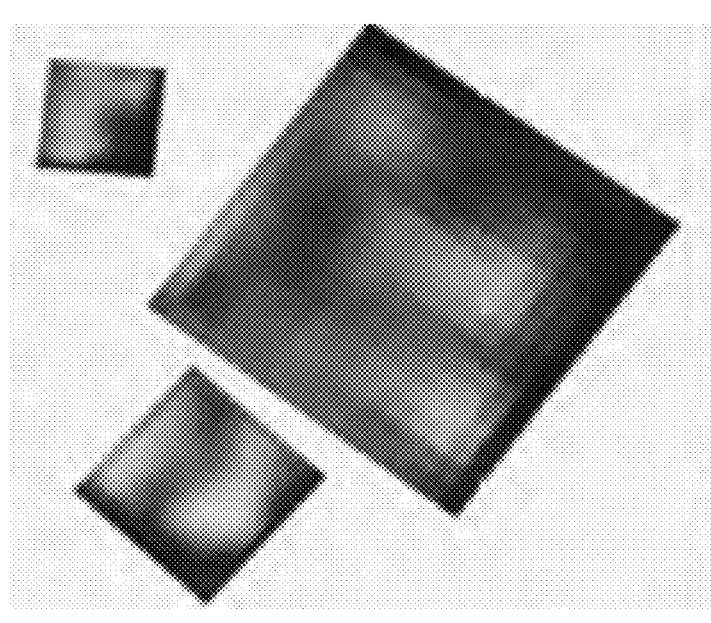
Figure 7:
FIG. 7 is a view for describing an example of a training dataset, according to an embodiment of the inventive concept.
Figure 8:
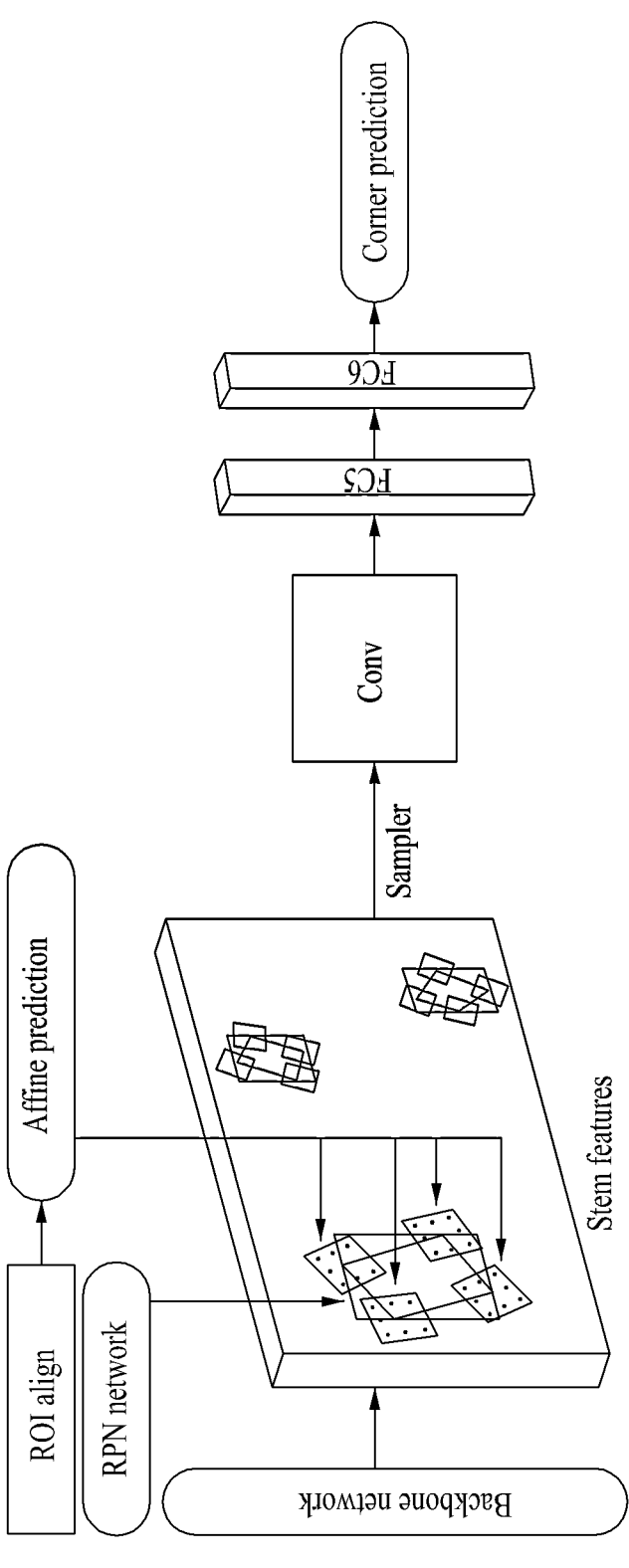
FIG. 8 illustrates a detailed configuration of a corner head, according to an embodiment of the inventive concept.

FIGS. 3A and 3B illustrate views for describing an example of rendering, according to an embodiment of the inventive concept. FIGS. 4A to 4F illustrate rendering components, according to an embodiment of the inventive concept. FIG. 5 shows an example of a marker configuration, according to an embodiment of the inventive concept. Furthermore, FIGS. 6A to 6H illustrate examples of an imaging artifact, according to an embodiment of the inventive concept. FIG. 7 is a view for describing an example of a training dataset, according to an embodiment of the inventive concept. FIG. 8 illustrates a detailed configuration of a corner head, according to an embodiment of the inventive concept.

Referring to FIG. 2, an artificial intelligence-based deformable fiducial marker generation and recognition system 200 according to an embodiment of the inventive concept proceeds in three folds depending on the end-to-end training of message encoding and decoding, and includes the marker generator 210, the imaging simulator 220, and the marker detector 230.

The marker generator 210 creates unique marker patterns from input binary messages. The created fiducial markers are then supplied to the imaging simulator 220 that consists of a differential renderer 221 and an imaging artifact augmenter 222. The imaging simulator 220 renders an image by creating a training dataset of a realistic scene image with the generated fiducial marker. The differentiable renderer 221 simulates the photorealistic appearance of the markers. The imaging artifact augmenter 222 simulates various imaging artifacts of deformation, perspective/lens distortion, motion blur, compression artifacts, and a variety of illumination conditions.

Lastly, the marker detector 230 is trained with the rendered image. The marker detector 230 consists of a localizer 231 that obtains regions of interest and a marker decoder 232 that detects corners and decodes messages via deformation-aware transformation. In this case, during inference, the identification of markers' binary messages is evaluated with the dictionary of markers.

Hereinafter, the marker generator 210, the imaging simulator 220, and the marker detector 230 in the artificial intelligence-based deformable fiducial marker generation and recognition system 200 according to an embodiment of the inventive concept will be described in detail with reference to FIGS. 2 to 8.

Marker Generator 210

Fiducial markers need to include a rich variety of appearance to be able to encode and decode a large number of messages. At the same time, a group of fiducial markers needs to look similar among the fiducial markers in a way to be robustly detected by a marker detection method. On the other hand, from the perspective of the detector, the marker patterns need to look unique against natural objects' appearance in the real-world so as to be detected clearly. Otherwise, a detector may fail with false-positive identification.

Conventional fiducial markers consist of black/white (or color) patterns enclosed by a border. Marker patterns are analytically designed to achieve the aforementioned goals. However, the number of such hand-crafted patterns is very limited to hundreds, and still, these patterns may not guarantee robust performances under deformation, distortion, and motion blur.

To achieve the capability of embedding a large number of messages, the inventive concept applies steganography, which is a practice of concealing a message within another message. Design insight is based on binary encoding and decoding of embedded messages. However, different from conventional steganography, a method according to an embodiment of the inventive concept learns alternative representations of binary codes, which are associated with the latent representations of real-time object detection network jointly trained in the end-to-end manner. According to an embodiment of the inventive concept, an approach may embed a very large number of binary messages that grow exponentially by the size of the message/number of bits.

As illustrated in FIG. 2, the marker generator 210 may begin with a baseline generative model, which is StyleGan. The baseline generative model includes the adaptive instance normalization (AdaIn) operator, which learns to align the mean and variance of feature channels. The AdaIn operator helps transformation from the binary message domain to the real-world domain for the markers for better detection and decoding.

Furthermore, the marker generator 210 may adopt the generation block of StyleGan with the AdaIn operator. The original generative model is trained on images with progressively higher resolution. Because a relatively small resolution (32×32) is used compared to natural images, a progressive resolution approach may not be included.

In detail, the marker generator 210 according to an embodiment of the inventive concept may apply FC linear transformation to the input binary messages (211). The marker generator 210 may then normalize these transformed features and may apply an activation function. The marker generator 210 may re size the features from the function of the FC layer 211 into a four-by-four shape. As a next, the marker generator 210 may control the appearance of the markers through convolutional generation blocks (212). Each generation block may apply upsampling at first and then may perform convolution and normalization operations 213 and 214. Style controlling weights of the AdaIn are computed through applying the FC layer transformations further to the transformed message features. Moreover, the inventive concept may use the Leaky ReLu activation function after convolutional layers. Finally, the outputs of marker generation networks are applied to sigmoid function to normalize the output values within [0, 1] range in three color channels for rendering.

Imaging Simulator 220

The imaging simulator 220 is designed with two insights. First, a conventional learning-based approach has trained a marker generator or detector by superimposing markers on photographs from the MS COCO or ImageNet datasets. Markers are placed at random positions, ignoring scene geometry and illumination. Referring to FIGS. 3A and 3B, the realism (see FIG. 3A) of the training dataset thus superimposed randomly is far lower than actual images (see FIG. 3B) that include fiducial markers in the real-world scenes. The domain gap between the randomly superimposed images and natural images of fiducial markers may degrade training performance severely. It requires further efforts of domain adaptation. To mitigate the domain gap in training, the approach according to an embodiment of the inventive concept is to create photorealistic rendering images for training, where the generated markers are seamlessly rendered by physically-based rendering composed in real photographs. Second, the method according to an embodiment of the inventive concept has increased the messaging capability in an exponential scale by means of color patterns. However, it becomes more critical to learn the appearance variation of color patterns in the real-world environment because a color code is capable of being misinterpreted as a different code depending on environments. To mitigate these two challenges, the inventive concept may devise a differentiable image simulator 220 for photorealistic rendering of the generated fiducial markers.

The differentiable renderer 221 of the imaging simulator 220 simulates the photorealistic appearance of fiducial markers. In an end-to-end optimization framework according to an embodiment of the inventive concept, there is a need for a large number of photorealistic training images, where the generated markers are placed in real-world scenes at runtime. When the generated fiducial markers are rendered through a physically-based rendering framework, the rendering process may take a several hours to obtain a single high-resolution image. Instead, the inventive concept introduces a practical solution to create realistic marker images efficiently. In brief, the inventive concept may first prepare thousands of real-world video frames under different illumination, where multiple white boards as space holder are placed. Then, the inventive concept may render the generated markers on the board with diffuse shading of scene illumination and synthetic specular reflection. Lastly, augmentation operators according to an embodiment of the inventive concept simulate various imaging artifacts of deformation, projection, noise, illumination, and the like For a main training pipeline, the inventive concept may collect a real-image dataset, so-called placement dataset. Referring to FIG. 4A, the inventive concept consists videos of planar white boards in real scenes from simple to complex scenes with many objects. The inventive concept may capture video frames of 140 real-world scenes under various illumination conditions indoor and outdoor with two DSLR cameras (Canon EOS 5Ds equipped with 22 mm and 50 mm lenses, respectively). To capture high-quality photographs without imaging artifacts, such as motion blur, the inventive concept may capture videos at a short shutter rate using two 3-axis gimbals. The white board may include the initial Aruco markers on the corners, which are used for automatic localization of the white board. The inventive concept may detect the white board's location and orientation from the initial markers, and may estimate homography for the marker placement later on. Afterward, as illustrated in FIG. 4B, to provide a spotless surface for rendering, the inventive concept may remove the initial Aruco markers using two inpainting algorithms.

During training, the inventive concept may create 96 unique messages at each iteration, and may feed the 96 unique messages to a generator. As illustrated in FIG. 5, for each board, the inventive concept may select one of the preset layout configurations. Next, the inventive concept may place markers by randomly selecting one or more among the 96 markers depending on the boards homography and layout. Using the 96 unique markers per iteration provided better convergence, as opposed to using unique markers for each location. In addition, identification indices of the markers later provide ground-truth labels to calculate the average precision score.

For the planar board, the inventive concept may use diffuse white paper evenly attached on an aluminum plate such that surface exhibits mostly Lambertian reflection. Assuming paper surface and marker's surface have constant BRDFs:

$$f_{x,\vec{n},m_p}(\vec{w}, \vec{v}) = \frac{\rho_p}{\pi} \text{ and } f_{x,\vec{n},m_t}(\vec{w}, \vec{v}) = \frac{\rho_t}{\pi}$$

for the camera direction $\vec{v}$, radiance from surface point x in 3D is:

$$L(x, \vec{v}) = \frac{\rho}{\pi} \int_\Omega L(\vec{w}, x)\cos(\theta)d\omega.$$

Therefore, the reflected radiance of the surface is proportional to the diffuse reflectance ratio between the target rendering surface and the paper surface. The reflected radiance may be computed as:

$$L_{m_t}(x, \vec{v}) = L_{m_p}(x, \vec{v})\frac{\rho_t}{\rho_p}.$$

Figure 4D:
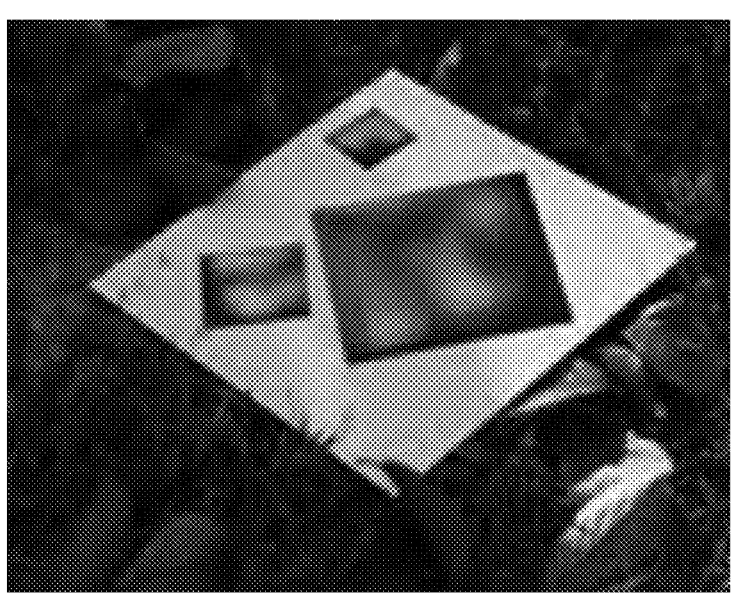
Figure 4E:
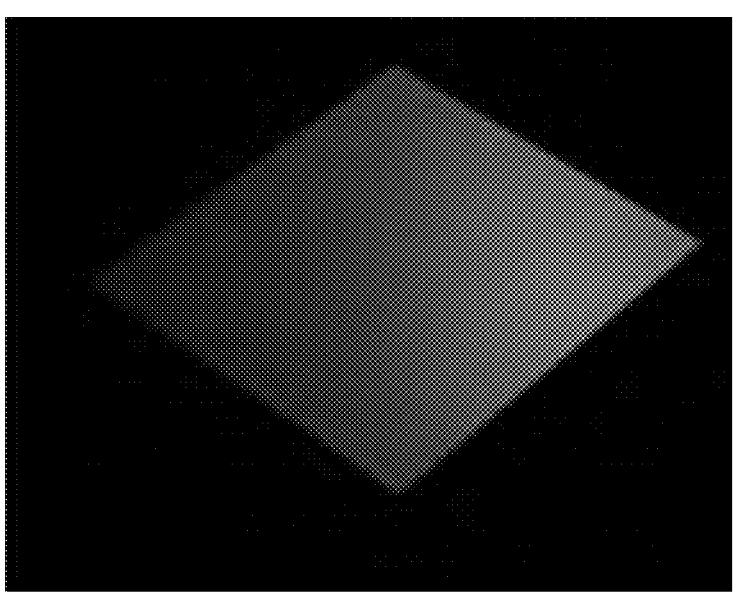
Figure 4F:
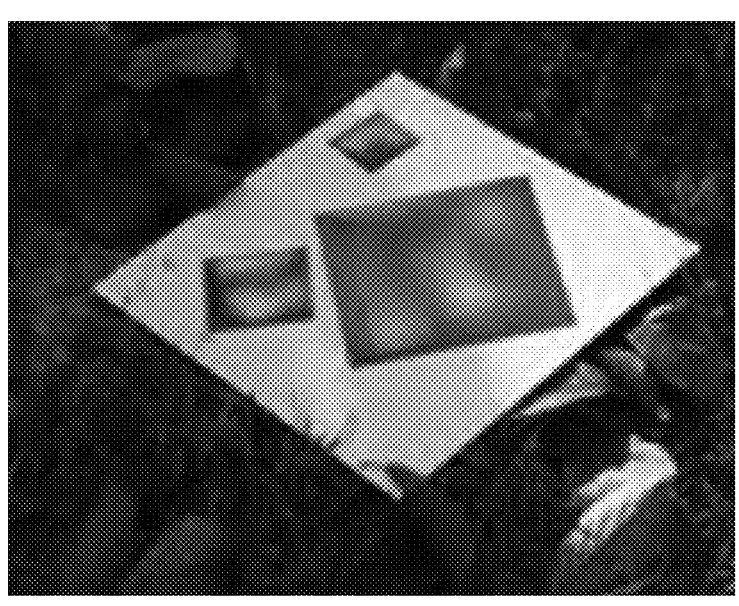
Figure 5:
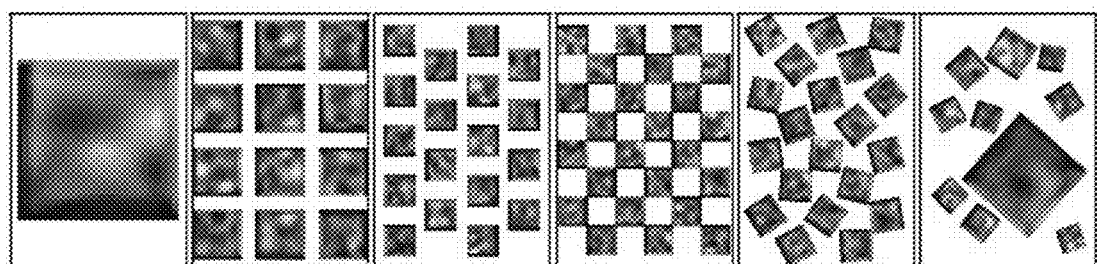
FIG. 5 shows an example of a marker configuration, according to an embodiment of the inventive concept.
Figure 6A:
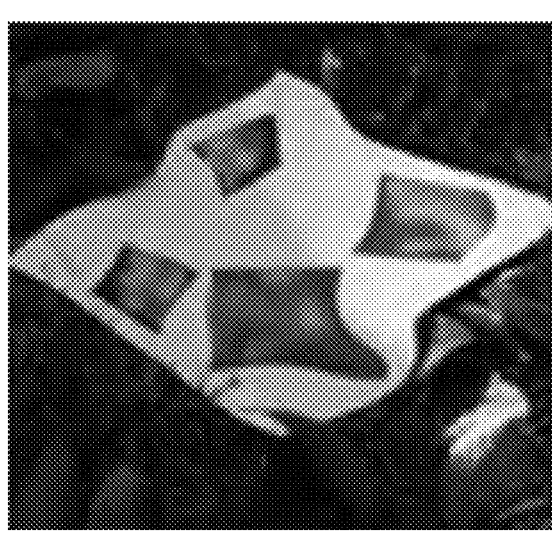
FIGS. 6A to 6H illustrate examples of an imaging artifact, according to an embodiment of the inventive concept.
Figure 6B:
Figure 6C:
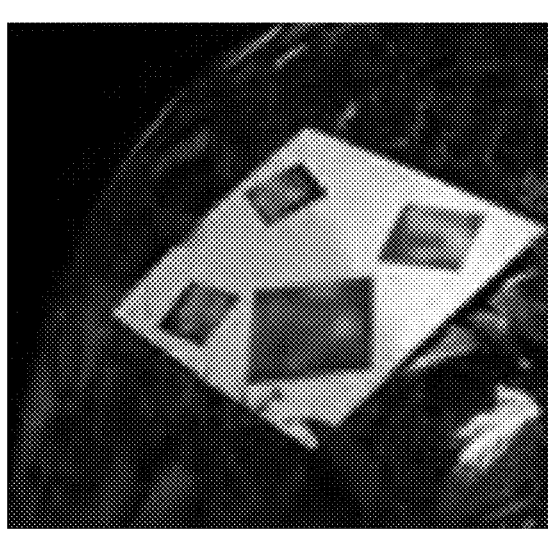
Figure 6D:
Figure 6E:
Figure 6F:
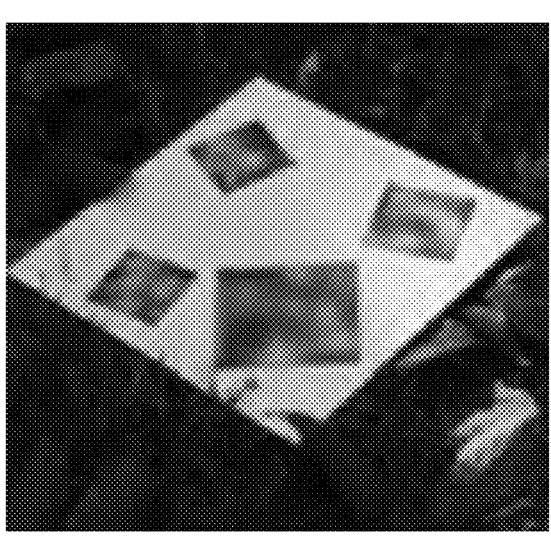
Figure 6G:
Figure 6H:

The marker colors are then multiplied by corresponding surface pixels and divided by the surface's proportional diffuse reflectance (see FIG. 4D). The inventive concept may calculate color in linear color space, and then may correct gamma of the color before providing the calculated color to a detection network.

Real-world paper and printer ink often present specular reflections. To simulate shininess of real-world paper, the inventive concept may introduce specular rendering (see FIG. 4E). The inventive concept may use the surface normals, viewing directions, and surface pixel values to create specular effects and may select the light direction from perfect reflection direction of the brightest point within the board. Moreover, the inventive concept may define the light's color as the normalized color of the brightest point, with a randomized intensity power value, scaled by the boards overall brightness. The inventive concept may use Cook-Torrance microfacet BRDF model with GGX microfacet distribution function to render specular highlight on surfaces. For the specular component, the inventive concept may fix roughness and specular albedo across the surface with small normal perturbations. This approach shows viable renderings of specular effects that occur in the wild (see FIGS. 3B and 4F for rendering results used for training).

The imaging artifact augmenter 222 of the imaging simulator 220 simulates various imaging artifacts of deformation, perspective/lens distortion, motion blur, compression artifacts, and a variety of illumination conditions.

As described above, many edge cases are present for recognition. Accordingly, it is not enough to simply feed rendered images with labels to the detection pipelines. Therefore, the artificial intelligence-based deformable fiducial marker generation and recognition system 200 according to an embodiment of the inventive concept may devise an imaging artifact simulator for differentiable augmentations of rendered images to generalize for the difficult conditions. FIGS. 6A to 6H present examples of artifacts.

To simulate scenarios of deformed and non-flat placement of markers, the inventive concept may warp the rendered image by using thin-plate splines (TPS) at training time. The inventive concept may intentionally deform the surfaces in an algorithmic manner, rather than capturing predefined non-planar surfaces. This decision is taken to avoid any potential risk of the network's overfitting to a limited number of predefined shapes. Also, preparing real objects of various shapes is cumbersome.

In detail, the inventive concept may first define control points in the target image as a uniform grid. The inventive concept may then shift them, each in a random direction and amplitude, to obtain the control points in the source image. Finally, the inventive concept used TPS to create a dense sampling grid following the control points. This process allows for varied deformation and distortion while the properties of TPS ensure smoothness. (see FIG. 6A).

It is worth noting that while applying these non-linear geometric distortions, the inventive concept needs to recalculate ground-truth labels such as marker corners. Besides, the inventive concept may store and recalculate uniform marker sampling locations, which are later used to teach the network to explicitly invert all the nonlinear transformations applied to the marker.

To cover a more variety of perspective distortions, the inventive concept applies random homography to an image with bilinear sampling. The inventive concept may also simulate radial distortion following the Brown-Conrady model [Fryer and Brown 1986] with three random coefficients and random focal length and distortion center. In particular, the inventive concept may focus on barrel distortion (negative coefficients) as the popular wide field of view lenses are usually prone to it.

Because a method according to an embodiment of the inventive concept uses color features, it is important to have a realistic variety of colors and brightness of the environment. Environment illumination conditions, such as specular reflections, surface roughness, shadows, and scarce light exposure, affect the measured irradiance. The inventive concept may cover specular reflection with different roughness values, and shadows in the rendering section. For enhanced robustness of the detector under ill-conditioned illumination, the inventive concept may apply random brightness re-scale to the whole images. In addition, the inventive concept may introduce non-linear transformations through random gamma correction and also may shift hues for better generalization to different lighting environments.

The inventive concept simulates imaging artifacts related to the camera. That is, defocus assuming a randomized circular aperture and constant depth over the image and motion blur of variable magnitudes and directions. The inventive concept also introduces Gaussian noise with a random standard deviation to mimic CMOS sensor noise with different ISO parameters. The inventive concept may finally reproduce compression artifacts through differentiable JPEG approximation.

After augmentations are applied, the inventive concept may apply gamma correction to the augmented colors convert back to sRGB values, and may clamp them to the valid range for the detection network. During training, the inventive concept may create random binary messages of given bits to generate fiducial markers. Until finishing 12 epochs, the inventive concept may create about 561,912 unique images with all augmentations. At this time, an example of the training dataset is as shown in FIG. 7.

Marker Detector 230

According to an embodiment of the inventive concept, an ultimate goal for marker detection is to detect multiple markers within the image and decode binary messages of each marker in real time. To develop a novel real-time marker detector, the inventive concept may use the two-stage Faster-RCNN approach that employs backbone features exclusively for both the region proposal and classification tasks. In addition, the inventive concept needs a marker detector to be scale-invariant. Therefore, the inventive concept designs two main RoI heads that are shared across the different scales of the backbone features: (1) corner detection and (2) message decoding heads. To utilize backbone features efficiently, the inventive concept only spatially transforms them by inverse warping through two-stages of resampling, and avoids costly convolution operation. This makes a decoding network invariant to the non-linear deformation transformation, while keeping the network depth shallow.

The artificial intelligence-based deformable fiducial marker generation and recognition system 200 according to an embodiment of the inventive concept exclusively makes use of features from the backbone network of object detection. First, features are used by the region proposal network (RPN) for obtaining the regions of interest (RoIs) and its initial bounding box proposal. Second, using the bounding box proposals, features are resampled by the RoI align operation. Lastly, the pooled features are directly used for (1) predicting corners by estimating affine transformation matrices and (2) decoding messages via deformation-aware sampling.

Furthermore, the inventive concept includes a feature pyramid network (FPN) in a network to aid possible scale differences further. With the consideration of real-time performance of detection, the inventive concept chooses VovNet as a backbone network.

Corners of markers are the critical information for various applications of fiducial markers, enabling object tracking and camera pose estimation. However, corners are a type of information that does not include any high-level semantic meaning, and thus when the inventive concept uses high-level features for training the corner detector, it could not perform very well. Accordingly, the inventive concept determines to use the low-level stem features from the backbone network directly, rather than high-level FPN features. The detailed architecture of the corner detector is shown in FIG. 8. For robust detection of corners, the inventive concept estimates affine transformations of sampling window for each corner with respect to the center origin of the normalized RoI domain. The inventive concept then samples the stem features through the transformation and then applies a convolutional and two fully connected layers to predict the corner location. The inventive concept uses the predicted corners to calculate corner loss as in Equation 1 below.

$$\mathcal{L}_{corner} = \frac{1}{8N_{total}} \|x_{gt} - x_{predict}\|_1 \qquad \text{[Equation 1]}$$

Here, $N_{total}$ is the total number of regions. $x_{gt}$ and $x_{predict}$ present pixel coordinates of ground-truth and prediction, respectively, and the loss computed for only foreground regions.

A spatial transformer network has been used broadly for object classification to enhance classification performance by inferring optimal inverse transformation. However, it lacks explicit knowledge of geometric transformations. In contrast, the inventive concept may actively leverage the explicit knowledge of geometric transformation applied to markers to estimate inverse transformation of deformation.

To this end, the inventive concept may first calculate uniform sampling locations in the marker domain. Every time a transformation is applied, the inventive concept may recalculate these locations. After the inventive concept may apply homography transformation for rendering, in the augmentation stage, the inventive concept may apply affine augmentation, lens distortion, and thin-plate spline warping consecutively and may recalculate sampling locations. It is assumed that when the network is capable of predicting these locations correctly, the network may understand the forward warping applied, and may inverse them to normalize markers back to generated marker domain. The sampling resolution is set to 9×9, for the 12×12 pooled RoI region. In addition, the inventive concept may set a sampling loss from calculated ground truth feature sample locations for decoding as in Equation 2 below.

$$\mathcal{L}_{sample} = \frac{1}{2N_{total}N_{sample}}\|x_{gt} - x_{predict}\|_1 \qquad \text{[Equation 2]}$$

Here, $N_{sample}$ is the total number of sample locations (9×9).

As a next step, the inventive concept may resample from the pooled RoI features by using predicted sampling locations with bilinear sampling. Then, the inventive concept may apply fully connected layers to the geometrically normalized marker features. For comparison study of conventional markers, the cross-entropy loss is used to predict the marker class. For learned markers, the inventive concept has decoding loss as in Equation 3 below.

$$\mathcal{L}_{decode} = \frac{1}{N_{total}N_{bits}}\|m_{encoded} - m_{decoded}\|_2^2 \qquad \text{[Equation 3]}$$

Here, $N_{bits}$ is the total number of bits in a binary message, $m_{encoded}$ and mdecoded present the encoded binary message of ground-truth and the decoded message, respectively.

The inventive concept also predicts objectness for each RoI. The inventive concept may use binary cross entropy as an objectness loss $L_{obj}$, which later used for non-maximal suppression.

The final loss term according to an embodiment of the inventive concept is formulated as in Equation 4 below.

$$\mathcal{L}_{total} = \left(\mathcal{L}_{rpn_{class}} + \mathcal{L}_{rpn_{loc}}\right) + \qquad \text{[Equation 4]}$$
$$\mathcal{L}_{sample} + 0.1\mathcal{L}_{corner} + (0.5\mathcal{L}_{obj} + 10.0\mathcal{L}_{decode})$$

Here, $L_{rpn}$ loss comes from region proposal network's objectness and bounding box prediction, which is unchanged from the original detection network.

Once training the end-to-end system for encoding/decoding messages, the inventive concept may identify markers by using a marker detector network. From the decoder network, the inventive concept may receive a binary message, which is a 36-bit dimensional feature vector of binary codes, and may check the identification by comparing the binary codes of each message with the dictionary. When the confidence level of matching is lower than 80%, the inventive concept may the identification.

The above-described system or device may be implemented with hardware elements, software elements, and/or a combination of hardware elements and software elements. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments may be recorded in computer-readable media including program instructions to implement various operations embodied by a computer. The computer-readable medium may also include the program instructions, data files, data structures, or a combination thereof. The program instructions recorded in the media may be designed and configured especially for the example embodiments or be known and available to those skilled in computer software. The computer-readable medium may include a hardware device, which is specially configured to store and execute program instructions, such as magnetic media (e.g., a hard disk drive and a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like. The described hardware devices may be configured to act as one or more software modules to perform the operations of the above-described embodiments, or vice versa.

While embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

According to embodiments of the inventive concept, it is possible to recognize widely deformable markers with high accuracy by being jointly optimized through a distinguishable photorealistic renderer in an end-to-end manner by using a deformable marker generator and imaging simulator and a detector network of marker detectors.

According to embodiments of the inventive concept, a deformable marker system according to an embodiment of the inventive concept may decode 36-bit messages successfully at maximally 29 fps with severe shape deformation. Results validate that the deformable marker system significantly outperforms the conventional and data-driven marker methods.

According to an embodiment of the inventive concept, a learning-based marker system opens up new interesting applications of fiducial markers, including cost-effective motion capture of the human body, active 3D scanning using a fiducial markers' array as structured light patterns, and robust augmented reality rendering of virtual objects on dynamic surfaces.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for generating and recognizing a deformable fiducial marker based on artificial intelligence, the method comprising:

generating, by a marker generator, a fiducial marker in a generated unique marker pattern in an input binary message;

rendering, by an imaging simulator, an image by generating a training dataset of a realistic scene image with the generated fiducial marker; and training a marker detector with the rendered image, wherein the rendered image includes shape deformation of the generated fiducial marker, and wherein the shape deformation includes thin-plate spline (TPS) based augmentation to simulate deformed and non-planar placement of the generated fiducial marker in the realistic scene image, wherein the imaging simulator includes a differentiable renderer and an imaging artifact augmenter, and wherein the rendering includes:

simulating, by the differentiable renderer, a photorealistic appearance of the fiducial marker; and simulating, by the imaging artifact augmenter, imaging artifacts of deformation, perspective/lens distortion, motion blur, compression artifacts, and illumination conditions.

2. The method of claim 1, wherein the generating includes:

generating the marker pattern, which is a series of free-form patterns to encode information in a unique visual code.

3. The method of claim 1, wherein the marker detector includes a localizer and a marker decoder, and wherein the training includes:

extracting a region of interest from the rendered image and performing training by simultaneously recognizing at least one or more marker patterns via a deformation-aware transformation.

4. The method of claim 1, wherein the generating includes:

a fully-connected (FC) layer step of applying an FC linear transformation to the input binary message;

a generation block step of controlling an appearance of a marker through a convolutional generation block, upsampling a generation block, and performing convolution and normalization operations; and a normalization step of normalizing an output value within range in three color channels for rendering, by applying a processed output to a sigmoid function.

5. The method of claim 4, wherein the FC layer step includes:

applying the FC linear transformation to the input binary message, normalizing a transformed function, and applying an activation function.

6. The method of claim 5, wherein the FC layer step includes:

resizing a function, which is normalized and reconstructed by applying the FC linear transformation, to a four-by-four shape.

7. The method of claim 4, wherein the generation block step includes:

applying a weight of an adaptive instance normalization operator (AdaIn) to a message function to which the FC linear transformation is applied.

8. The method of claim 1, wherein the rendered image further includes realistic shading including specular reflection, optical distortion, defocus and motion blur, color alteration, and imaging noise.

9. A method for generating and recognizing a deformable fiducial marker based on artificial intelligence, the method comprising:

generating, by a marker generator, a fiducial marker in a generated unique marker pattern in an input binary message; and rendering, by a detector network, an image by generating a training dataset of a realistic scene image with the generated fiducial marker, and performing training with the rendered image, wherein the rendered image includes shape deformation of the generated fiducial marker, and wherein the shape deformation includes thin-plate spline (TPS) based augmentation to simulate deformed and non-planar placement of the generated fiducial marker in the realistic scene image, wherein the rendering includes:

rendering the image by simulating, by a differentiable renderer in the detector network, a photorealistic appearance of the fiducial marker and simulating, by an imaging artifact augmenter in the detector network, imaging artifacts of deformation, perspective/lens distortion, motion blur, compression artifacts, and illumination conditions.

10. The method of claim 9, wherein the generating includes:

a FC layer step of applying an FC linear transformation to the input binary message;

a generation block step of controlling an appearance of a marker through a convolutional generation block, upsampling a generation block, and performing convolution and normalization operations; and a normalization step of normalizing an output value within range in three color channels for rendering, by applying a processed output to a sigmoid function.

11. The method of claim 9, wherein the rendering and the performing of the training includes:

extracting, by a localizer and a marker decoder in the detector network, a region of interest from the rendered image and performing training by simultaneously recognizing at least one or more marker patterns via a deformation-aware transformation.

12. An artificial intelligence-based deformable fiducial marker generation and recognition system, the system comprising:

a marker generator configured to generate a fiducial marker in a generated unique marker pattern in an input binary message;

an imaging simulator configured to render an image by generating a training dataset of a realistic scene image with the generated fiducial marker, wherein the rendered image includes shape deformation of the generated fiducial marker, and wherein the shape deformation includes thin-plate spline (TPS) based augmentation to simulate deformed and non-planar placement of the generated fiducial marker in the realistic scene image, wherein the imaging simulator includes a differentiable renderer and an imaging artifact augmenter, wherein the differentiable renderer simulates a photorealistic appearance of the fiducial marker, and wherein the imaging artifact augmenter simulates imaging artifacts of deformation, perspective/lens distortion, motion blur, compression artifacts, and illumination conditions; and a marker detector configured to perform training with the rendered image.

13. The system of claim 12, wherein the marker generator generates the marker pattern, which is a series of free-form patterns to encode information in a unique visual code.

14. The system of claim 12, wherein the marker generator applies an FC linear transformation to the input binary message, controls an appearance of a marker through a convolutional generation block, upsamples a generation block, performs convolution and normalization operations, and normalizes an output value within range in three color channels for rendering, by applying a processed output to a sigmoid function.

15. The system of claim 12, wherein the marker detector includes a localizer and a marker decoder, and extracts a region of interest from the rendered image and performs training by simultaneously recognizing at least one or more marker patterns via a deformation-aware transformation.

16. An artificial intelligence-based deformable fiducial marker generation and recognition system, the system comprising:

a marker generator configured to generate a fiducial marker in a generated unique marker pattern in an input binary message; and a detector network configured to render an image by generating a training dataset of a realistic scene image with the generated fiducial marker, and to perform training with the rendered image, wherein the rendered image includes shape deformation of the generated fiducial marker, and wherein the shape deformation includes thin-plate spline (TPS) based augmentation to simulate deformed and non-planar placement of the generated fiducial marker in the realistic scene image, wherein the detector network renders the image by simulating a photorealistic appearance of the fiducial marker by using a differentiable renderer and simulating imaging artifacts of deformation, perspective/lens distortion, motion blur, compression artifacts, and illumination conditions by an imaging artifact augmenter.

17. The system of claim 16, wherein the detector network extracts a region of interest from the rendered image and performs training by simultaneously recognizing at least one or more marker patterns via a deformation-aware transformation, by using a localizer and a marker decoder.

* * * * *